United States Patent
Jeon

(10) Patent No.: US 9,315,181 B2
(45) Date of Patent: Apr. 19, 2016

(54) BRAKE CONTROL SYSTEM AND METHOD FOR VEHICLE

(71) Applicant: Hyundai Motor Company, Seoul (KR)

(72) Inventor: Gab Bae Jeon, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 108 days.

(21) Appl. No.: 14/138,785

(22) Filed: Dec. 23, 2013

(65) Prior Publication Data

US 2014/0292065 A1    Oct. 2, 2014

(30) Foreign Application Priority Data

Apr. 1, 2013  (KR) .................. 10-2013-0035369

(51) Int. Cl.
*B60T 8/40*  (2006.01)
*B60T 7/04*  (2006.01)
*B60T 13/14*  (2006.01)

(52) U.S. Cl.
CPC .............. *B60T 8/409* (2013.01); *B60T 7/042* (2013.01); *B60T 8/4086* (2013.01); *B60T 13/143* (2013.01); *B60T 8/4077* (2013.01)

(58) Field of Classification Search
CPC ....... B60T 8/409; B60T 7/042; B60T 8/4086; B60T 13/143; B60T 8/4077
USPC ............ 303/155, 167, 113.4, 119.1, DIG. 11; 701/70, 71; 188/151 R
See application file for complete search history.

(56) References Cited

U.S. PATENT DOCUMENTS 7,303,242 B1 * 12/2007 Mackiewicz .......... B60T 8/4881 303/113.1
2013/0106170 A1 * 5/2013 Baek .................... B60T 13/166 303/11
2013/0320750 A1 * 12/2013 Kim ....................... B60T 7/042 303/6.01
2014/0117749 A1 * 5/2014 Yang ...................... B60T 7/042 303/20
2014/0361473 A1 * 12/2014 Ryu ......................... B60T 7/06 267/140.2

FOREIGN PATENT DOCUMENTS

| | | |
|---|---|---|
| JP | 2000280872 A | 10/2000 |
| JP | 2002-308084 A | 10/2002 |
| JP | 2003312458 A | 11/2003 |
| JP | 2005-112034 A | 4/2005 |
| JP | 2007-008363 A | 1/2007 |
| JP | 2009-067320 A | 4/2009 |
| JP | 2013-043489 A | 3/2013 |
| KR | 20-1998-0030134 U | 8/1998 |

* cited by examiner

*Primary Examiner* — Melanie Torres Williams
(74) *Attorney, Agent, or Firm* — Mintz Lein Cohn Ferris Glovsky and Popeo, P.C.; Peter F. Corless

(57) ABSTRACT

A brake control system and method that include a master cylinder that transmits braking hydraulic pressure to a wheel and a hydraulic power unit that supplies hydraulic pressure to the master cylinder to produce the braking hydraulic pressure transmitted to the wheel. A push rod is operated according to a brake pedal operation and a push rod cylinder is formed for the push rod to perform reciprocal motion in the push rod cylinder. A reaction force producer supplies hydraulic pressure to the push rod cylinder to produce reaction force against the push rod operation. A solenoid within the reaction force producer is operated by electric power to produce the reaction force. A pedal stroke sensor detects a brake pedal stroke and a brake control unit connected to the hydraulic power unit, the reaction force producer, and the pedal stroke sensor, operates the hydraulic power unit and the reaction force producer.

13 Claims, 8 Drawing Sheets

<Basic characteristic>

<Characteristic after change>

<Basic characteristic>

<Characteristic after change>

BRAKE CONTROL SYSTEM AND METHOD FOR VEHICLE

CROSS-REFERENCE TO RELATED APPLICATION

This application claims priority to and the benefit of Korean Patent Application No. 10-2013-0035369 filed in the Korean Intellectual Property Office on Apr. 1, 2013, the entire contents of which are incorporated herein by reference.

BACKGROUND (a) Field of the Invention

The present invention relates to a brake control system and method for a vehicle, and more particularly, to a brake control system for a vehicle, applied to a hybrid vehicle to change reaction force of a pedal.

(b) Description of the Related Art

In general, a cooperative control for regenerative braking system of a hybrid vehicle includes a hydraulic power unit that generates a pedal engagement signal, and amplifies and controls fluid pressure to control braking force of an accelerator pedal and a brake pedal to compensate for a pedal manipulating feeling. However, pedal effort may not be easily changed using a pedal simulator of the related art. In addition, even though a change of pedal effort is implemented by the pedal simulator of the related art, a level thereof may be limited.

The above information disclosed in this section is only for enhancement of understanding of the background of the invention and therefore it may contain information that does not form the prior art that is already known in this country to a person of ordinary skill in the art.

SUMMARY

The present invention provides a brake control system and method for a vehicle, in which reaction force of a pedal is changed based on a driver intention, and a size of pedal effort may be determined. In addition, the present invention provides a brake control system for a vehicle, which changes reaction force of a pedal and maintains performance of a brake in which reliability may be secured.

An exemplary embodiment of the present invention provides a brake control system for a vehicle, including a master cylinder configured to transmit braking hydraulic pressure to a wheel; a hydraulic power unit configured to supply hydraulic pressure to the master cylinder to cause the master cylinder to produce braking hydraulic pressure transmitted to the wheel; a push rod operated based on an operation of a brake pedal to cause the master cylinder to produce braking hydraulic pressure transmitted to the wheel; a push rod cylinder formed to allow the push rod to perform reciprocal motion within the push rod cylinder; a reaction force producer configured to supply hydraulic pressure to the push rod cylinder to produce reaction force against an operation of the push rod; a solenoid disposed within the reaction force producer and operated by electric power to cause the reaction force producer to produce the reaction force; a pedal stroke sensor configured to detect a stroke of the brake pedal; and a brake control unit connected to the hydraulic power unit, the reaction force producer, and the pedal stroke sensor, configured to operate the hydraulic power unit and the reaction force producer, and configured to control a relationship of braking force, the reaction force, and the stroke, in which the brake control unit may be configured to operate electric power applied to the solenoid to control a size of the reaction force.

The brake control system may further include a display device configured to display a state of the braking force, the reaction force, and the stroke on a screen to control a relationship of the braking force, the reaction force, and the stroke based on the driver intention, and configured to recognize the driver intention; and a display control unit connected to the display device and the brake control unit, configured to operate the display device, and configured to transmit the driver intention recognized by the display device to the brake control unit.

The display device may provide a menu from which a state of the braking force, the reaction force, and the stroke may be changed and may recognize the driver intention based on a menu selection. The display device may display the menu as a menu bar, as a menu panel including a plurality of buttons as a graph, and the like.

The brake control system may further include a reservoir tank configured to tune a flow rate by supplementing or receiving the flow rate on a hydraulic pressure line; and a control flow path formed to supply hydraulic pressure from the reservoir tank to the push rod cylinder, in which the hydraulic pressure in the push rod cylinder may be tuned by the hydraulic pressure supplied via the control flow path.

The push rod cylinder may be partitioned by the push rod to form chambers at both sides of the push rod cylinder, and the control flow path may branch (e.g., form multiple paths) to connect to the chambers at both sides, respectively. The control flow path may be blocked by an operation of the push rod.

The brake control system may further include a connecting flow path configured to connect the master cylinder and the push rod cylinder, in which the connecting flow path may be a hydraulic pressure line formed to transmit hydraulic pressure of the push rod cylinder to the master cylinder. A check valve may be disposed on the connecting flow path, and the check valve may be selectively opened and closed.

The reaction force producer may be formed in a cylinder shape, and may include: a reaction force piston provided to perform reciprocal motion in the reaction force producer; and an operating rod operated to push the reaction force piston, in which the solenoid may be formed in a hollow cylindrical shape, and the operating rod may be disposed in a hollow portion of the solenoid to be operated by an electric field generated by the solenoid.

Figure 1:
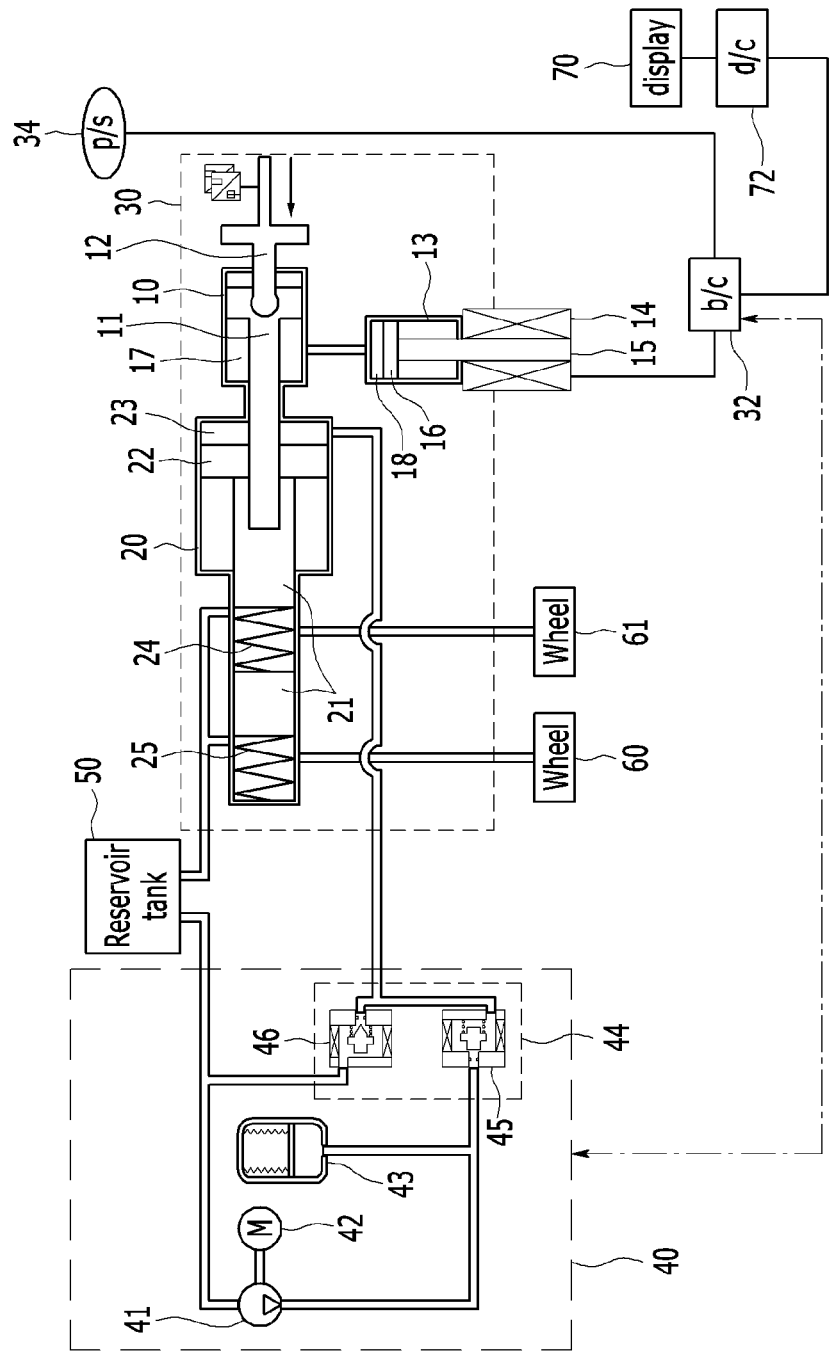
FIG. 1 is an exemplary view of a brake control system for a vehicle according to an exemplary embodiment of the present invention.

| Description of symbols | |
|---|---|
| 10: Push rod cylinder | 11: Push rod |
| 12: Push rod connecting unit | 13: Reaction force producer |
| 14: Solenoid | 15: Operating rod |
| 16: Reaction force piston | 17: First chamber |
| 18: Second chamber | 19: Third chamber |
| 20: Master cylinder | 21: Master cylinder piston |
| 22: Power piston | 23: Booster chamber |
| 24: First pressure chamber | 25: Second pressure chamber |
| 26: Connecting flow path | 27: Check valve |
| 30: Brake operating unit | 32: Brake control unit |
| 34: Pedal stroke sensor | 40: Hydraulic power unit |
| 41: Pump | 42: Motor |
| 43: High pressure tank | 44: Pressure adjusting device |
| 45: First pressure adjusting valve | |
| 46: Second pressure adjusting valve | |
| 50: Reservoir tank | 52: Push rod control flow path |
| 60, 61: Wheel | 70: Display device |
| 72: Display control unit | |

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

An exemplary embodiment of the present invention will hereinafter be described in detail with reference to the accompanying drawings.

FIG. 1 is an exemplary view of a brake control system for a vehicle according to an exemplary embodiment of the present invention. As illustrated in FIG. 1, a brake control system may include a brake operating unit 30, a hydraulic power unit 40, and a reservoir tank 50.

The brake operating unit 30 may include a push rod cylinder 10, and a master cylinder 20. The push rod cylinder 10 and the master cylinder 20 may be connected in series, coupled to each other, or integrally formed. A push rod 11 and a push rod connecting unit 12 may be disposed within the push rod cylinder 10. The push rod 11 may serve as a piston within the push rod cylinder 10, and may be extended into the master cylinder 20 while penetrating a connection portion between the push rod cylinder 10 and the master cylinder 20. The push rod connecting unit 12 may have one end connected to the push rod 11, and the other end connected to a brake pedal (not illustrated).

A master cylinder piston 21 and a power piston 22 may be provided within the master cylinder 20. In particular, the power piston 22 may be a piston that transmits hydraulic pressure to the master cylinder piston 21. The master cylinder piston 21 may include two pistons, and the two pistons may be elastically connected to each other inside the master cylinder 20. In addition, the two pistons may be installed to be spaced apart from each other to form a first pressure chamber 24 and a second pressure chamber 25. The first pressure chamber may be formed between the two pistons, and the second pressure chamber 25 may be formed to be enclosed by one of the pistons and an inner wall of the master cylinder 20.

The power piston 22 may be disposed within the master cylinder 20 to be disposed closer to the push rod cylinder 10 than the master cylinder piston 21. In addition, the power piston 22 may be in contact with the master cylinder piston 21 that is elastically supported. The push rod 11, the push rod connecting unit 12, the master cylinder piston 21, and the power piston 22 may be connected in series, and the push rod 11 may be provided to penetrate the power piston 22 to directly push the master cylinder piston 21.

A booster chamber 23 may be formed to be enclosed by the power piston 22 and the master cylinder 20 in a direction toward the push rod cylinder based on the power piston 22. When hydraulic pressure in the booster chamber 23 is increased, the power piston 22 may be pushed by the increased hydraulic pressure in a longitudinal direction of the master cylinder 20, and simultaneously, the master cylinder piston 21, which is in contact with the power piston 22, may be pushed. Therefore, when hydraulic pressure in the first and second pressure chambers 24 and 25 is increased, the increased hydraulic pressure may be transmitted to wheels 60 and 61, and a wheel cylinder (not illustrated) may be operated, thereby performing braking.

The hydraulic power unit 40 refers to a device that may be configured to produce hydraulic pressure and transmit the produced hydraulic pressure to the booster chamber 23 to increase hydraulic pressure in the booster chamber 23. In addition, the hydraulic power unit 40 may be configured to generate electrical energy during regenerative braking. Moreover, the hydraulic power unit 40 may include a pump 41, a motor 42, a high pressure tank 43, and a pressure adjusting device 44. The pump 41 and the motor 42 may be provided in the hydraulic power unit 40 in one or more numbers, respectively. The pump 41 may be configured to pump a fluid by driving the motor 42, to enable a smooth flow of the fluid in a regenerative braking system.

The high pressure tank 43 may be disposed within the hydraulic power unit 40 to maintain hydraulic pressure in the hydraulic power unit 40 to be a predetermined pressure or greater. In other words, a fluid may be stored in the high pressure tank 43, and a space in which the fluid is stored may be connected to a hydraulic pressure line disposed extraneous to the high pressure tank 43. In addition, the high pressure tank 43 may be configured to press the fluid that is stored in the high pressure tank 43, thereby maintaining hydraulic pressure to be a substantially high pressure state that is a predetermined pressure or greater. Therefore, when the fluid in the hydraulic power unit 40 is discharged to the exterior to transmit hydraulic pressure to the booster chamber 23, a flow of the fluid may be substantially smooth.

Figure 2:
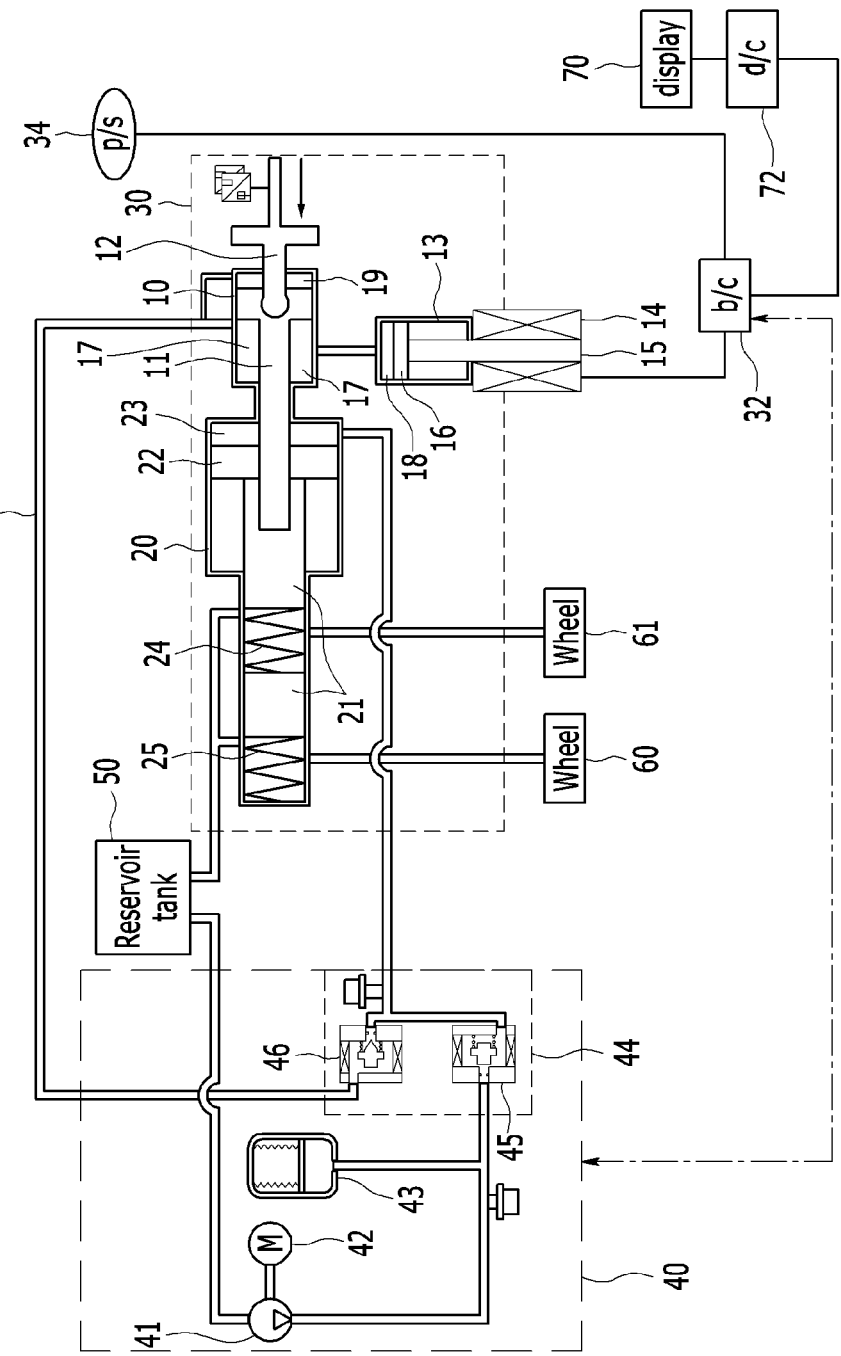
FIG. 2 is an exemplary view of a brake control system for a vehicle according to another exemplary embodiment of the present invention.
Figure 3:
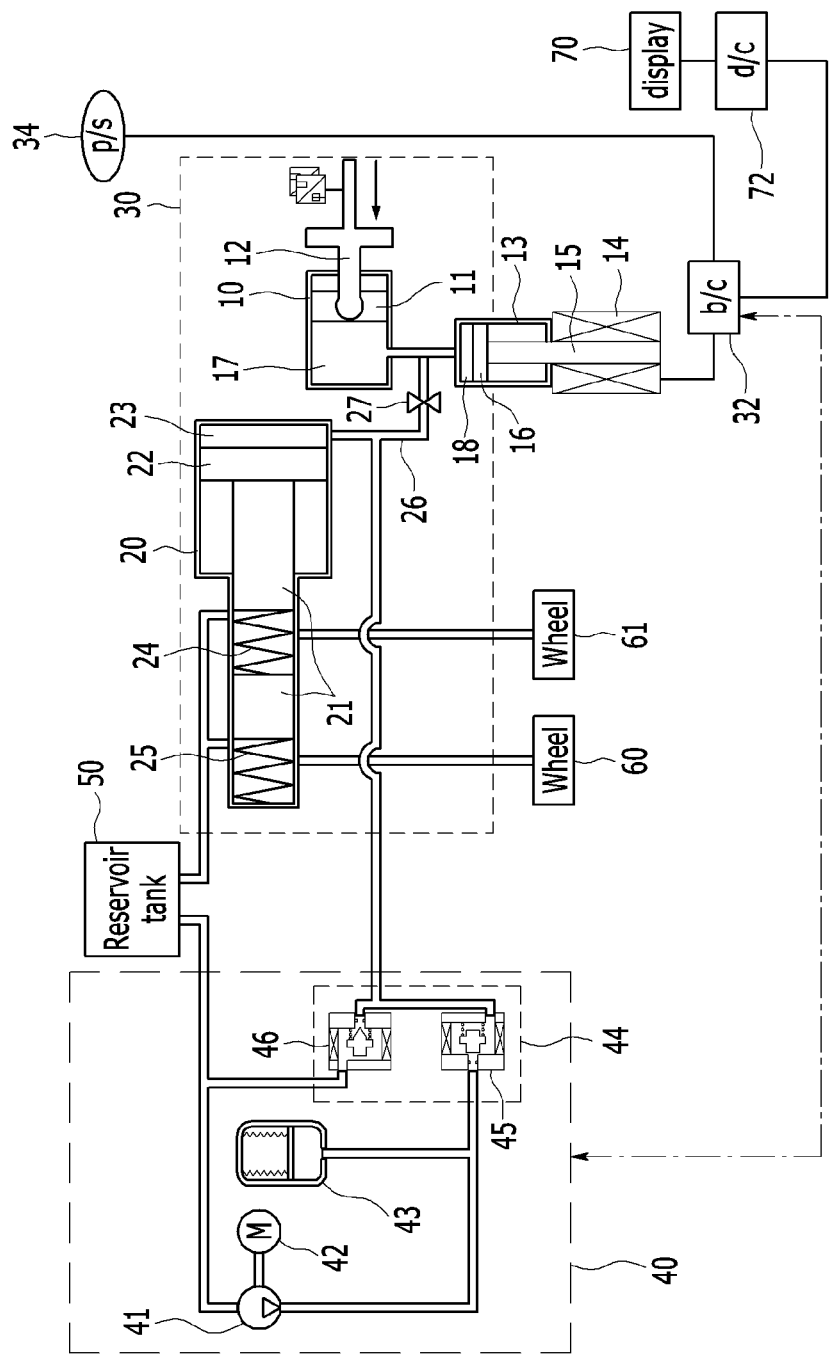
FIG. 3 is an exemplary view of a brake control system for a vehicle according to yet another exemplary embodiment of the present invention.

The pressure adjusting device 44 may include a plurality of pressure adjusting valves 45 and 46, and hydraulic pressure in the regenerative braking system may be adjusted by operations of the plurality of pressure adjusting valves 45 and 46. Although first and second pressure adjusting valves 45 and 46 are illustrated in FIGS. 1 to 3, the number of pressure adjusting valves 45 and 46 is not limited to two and may be varied as necessary. Since the hydraulic power unit 40 and the pressure adjusting device 44 are obvious to a person having ordinary skill in the art (hereinafter referred to as a person skilled in the art), a more detailed description will be omitted.

Moreover, braking is difficult using the hydraulic power unit 40, the push rod 11 may be configured to directly push the master cylinder piston 21 by an operation of a pedal (not illustrated), thereby performing braking. In addition, when braking is performed by the hydraulic power unit 40, the push rod 11 and the master cylinder piston 21 may be spaced apart from each other at a predetermined distance causing the power piston 22 pushes the master cylinder piston 21 before the push rod 11 to come into contact with the master cylinder piston 21.

The reservoir tank 50 refers to a device in which a volume of fluid may vary based on pressure changes, temperature changes, and the like. The reservoir tank 50 may serve to supplement the fluid when the fluid is insufficient, and maintain the fluid when the fluid is excessive. In other words, the reservoir tank 50 may tune hydraulic pressure of the brake operating unit 30 and the hydraulic power unit 40.

The brake operating unit 30 may further include a reaction force producer 13. The reaction force producer 13 refers to a device that may be configured to produce hydraulic pressure to apply reaction force when the brake pedal is engaged. In other words, pedal effort may be determined based on a reaction force produced by the reaction force producer 13.

Moreover, a chamber 17 may be formed within the push rod cylinder 10. For explanatory convenience, the chamber 17 is referred to as a first chamber 17. Hydraulic pressure produced by the reaction force producer 13 may be supplied to the first chamber 17. That is, the first chamber 17 may be formed to produce reaction force, which counters a movement of the brake pedal, by hydraulic pressure supplied from the reaction force producer 13. In particular, the reaction force, which counters a movement of the brake pedal, refers to reaction force against an operation of the push rod 11.

The reaction force producer 13, which may be configured to supply hydraulic pressure to the first chamber 17, may include a reaction force piston 16, an operating rod 15, and a solenoid 14. The reaction force piston 16 may be configured to perform reciprocal motion in the reaction force producer 13 that is formed in a cylinder shape. The operating rod 15 may be operated to push the reaction force piston 16.

The solenoid 14 refers to a typical solenoid made by densely and uniformly winding a wire in a hollow cylindrical shape, and may be configured to operate the operating rod 15 using electricity. In other words, the operating rod 15 may be an iron core operated in a hollow portion of the solenoid 14 by an electric field generated by the solenoid 14. Since operations of the solenoid 14 and the operating rod 15 are obvious to a person skilled in the art, a more detailed description will be omitted.

A chamber 18 may be formed within the reaction force producer 13. For explanatory convenience, the chamber 18 is referred to as a second chamber 18. The second chamber 18 may be filled with a fluid and may be pressed by the reaction force piston 16 to produce hydraulic pressure, which is supplied to the first chamber 17. In other words, reaction force, which counters a movement of the brake pedal, may be produced by operations of the solenoid 14 and the operating rod 15.

Furthermore, a capacity of the solenoid 14 may be determined based on a volume ratio of the first chamber 17 and the second chamber 18, and the volume ratio of the first chamber 17 and the second chamber 18 may be set to reduce a capacity of the solenoid 14 according to a design of a person skilled in the art.

The brake control system for a vehicle according to the exemplary embodiment of the present invention may further include a brake control unit 32, a pedal stroke sensor 34, a display device 70, and a display control unit 72. The brake control unit 32 may be configured to operate the hydraulic power unit 40 to supply hydraulic pressure to the booster chamber 23, and may be configured to operate the solenoid 14. In addition, the brake control unit 32 may be configured to operate electric power supplied to the solenoid 14, and maintain force with which the operating rod 15 may push the reaction force piston 16. In other words, the force with which the operating rod 15 pushes the reaction force piston 16 may be selectively changed. Moreover, as the reaction force, which counters a movement of the brake pedal, is selectively changed, the pedal effort may be changed.

The pedal stroke sensor 34 may be configured to detect a stroke of the engaged brake pedal, and transmit information regarding the stroke of the brake pedal to the brake control unit 32. Although not illustrated, the pedal stroke sensor 34 may be connected to the brake pedal.

A map in which a relationship of the stroke, the reaction force, and the braking force are set may be stored in a memory of the brake control unit 32. In addition, the brake control unit 32 may be configured to operate the solenoid 14 to cause the reaction force against the stroke to be provided based on the map. Moreover, the brake control unit 32 may be configured to operate the hydraulic power unit 40 to implement the braking force that is determined based on the map. Further, the brake control unit 32 may be configured to maintain electric power to not be applied to the solenoid 14 when braking is unable to be performed using the hydraulic power unit 40. A plurality of maps, selected based on a driver intention may be stored in the brake control unit 32 memory.

The display device 70 may provide a menu from which one of the plurality of maps may be selected. In addition, the menu may be displayed on a screen by the display device 70. In particular, the menu selection may be performed using a touch screen or via an operating key (not illustrated) provided at the display device 70. Additionally, the display control unit 72 may be configured to operate the display device 70 to display a state in which the map is selected on the screen of the display device 70. Therefore, the driver may recognize the presently selected map. In addition, the display control unit 72 may be configured to transmit information regarding the map selection. Moreover, the brake control unit 32 may be configured to operate the hydraulic power unit 40 and the solenoid 14 based on the selected map selected.

FIG. 2 is an exemplary view of a brake control system for a vehicle according to another exemplary embodiment of the present invention. In a description regarding a brake control system for a vehicle, which is illustrated in FIG. 2, a repeated description regarding the same constituent elements of the brake control system for a vehicle, which is illustrated in FIG. 1, will be omitted. As illustrated in FIG. 2, a brake control system for a vehicle according to another exemplary embodiment of the present invention may include a push rod control flow path 52.

The push rod control flow path 52 may be formed to transmit hydraulic pressure supplied from the reservoir tank 50 to the first chamber 17. In addition, the push rod control flow path 52 may be formed to pass through the hydraulic power unit 40 between the reservoir tank 50 and the first chamber 17. Therefore, as the brake control unit 32 operates the hydraulic power unit 40, hydraulic pressure in the reservoir tank 50 may be selectively transmitted to the first chamber 17. Although the push rod control flow path 52 connected to the second pressure adjusting valve 46 is illustrated in FIG. 2, the present invention is not limited thereto. As the push rod control flow path 52 is formed to transmit hydraulic pressure to the first chamber 17, hydraulic pressure for producing reaction force may be maintained even when a flow rate is varied due to a minute leakage.

The push rod control flow path 52 may be blocked by one surface of the push rod 11 when the push rod 11 is pushed by an operation of the brake pedal. In addition, when the push rod 11 is further pushed when the push rod control flow path 52 is blocked by the push rod 11, hydraulic pressure in the first chamber 17 may be transmitted to the second chamber 18. Moreover, the push rod control flow path 52 may branch, and a space opposite to the first chamber 17 based on the push rod 11 in the push rod cylinder 10 may communicate with the push rod control flow path 52. For explanatory convenience, the space opposite to the first chamber 17 is referred to as a third chamber 19. In other words, an interior of the push rod cylinder 10 may be partitioned by the push rod 11, and the first chamber 17 may be formed at a first side, and the third chamber 19 may be formed at a second side, by the push rod 11 in the push rod cylinder 10.

As hydraulic pressure in the reservoir tank 50 may be supplied the third chamber 19 via the push rod control flow path 52, negative pressure may be prevented from being generated in the third chamber 19. Therefore, the push rod 11 may be operated without hindrance by the negative pressure. Moreover, the push rod control flow path 52 that communicates with the third chamber 19 may be connected even when the push rod control flow path 52 that communicates with the first chamber 17 is blocked as described above. This function of the push rod control flow path 52 may improve a pedal feeling of the driver.

FIG. 3 is an exemplary view of a brake control system for a vehicle according to yet another exemplary embodiment of the present invention. In a description regarding a brake control system for a vehicle, which is illustrated in FIG. 3, a repeated description regarding the same constituent elements of the brake control system for a vehicle, which is illustrated in FIG. 1, will be omitted. As illustrated in FIG. 3, a brake control system for a vehicle according to yet another exemplary embodiment of the present invention may include a connecting flow path 26, and a check valve 27.

The connecting flow path 26 may connect the first chamber 17 and the booster chamber 23. In particular, the first chamber 17 and the booster chamber 23 may be connected by the connecting flow path 26, and the push rod 11 may operate as a piston inside the push rod cylinder 10. In other words, the push rod 11 of yet another exemplary embodiment of the present invention may be disposed as a piston, which may be operated to form hydraulic pressure within the first chamber 17 of the push rod cylinder 10, without being provided to directly push the master cylinder piston 21, unlike another exemplary embodiment of the present invention.

When the operating axis of the push rod 11 and the operating axis of the master cylinder 20 are not disposed on the same axis, it may be impossible to perform an operation of the push rod 11, which is illustrated in FIGS. 1 and 2. Therefore, other braking methods may be required when braking by the hydraulic power unit 40 is difficult. In yet another exemplary embodiment of the present invention, the first chamber 17 and the booster chamber 23 may be connected by the connecting flow path 26 causing braking to be performed by hydraulic pressure, which may be supplied from the first chamber 17 to the booster chamber 23, when it is impossible to perform braking by the hydraulic power unit 40.

The check valve 27 may be disposed on the connecting flow path 26. In addition, the check valve 27 may block the connecting flow path 26 when braking is performed by the hydraulic power unit 40, and may open the connecting flow path 26 when braking is not performed by the hydraulic power unit 40.

Figure 4:
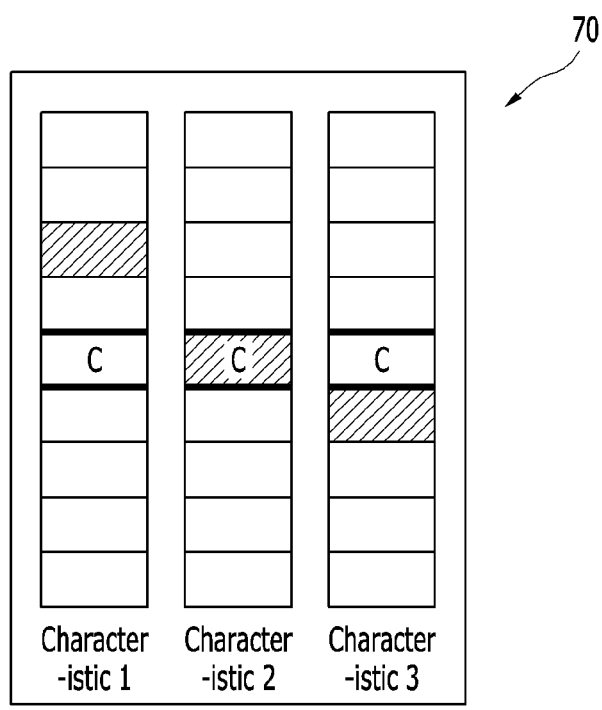
FIG. 4 is an exemplary view illustrating a display form of a display device according to the exemplary embodiment of the present invention.

FIG. 4 is an exemplary view illustrating a display form of the display device according to the exemplary embodiment of the present invention.

As illustrated in FIG. 4, a display form of the display device 70 according to the exemplary embodiment of the present invention refers to a form of displaying menu bars for characteristic 1, characteristic 2, and characteristic 3 on a screen of the display device 70. In particular, characteristic 1, characteristic 2, and characteristic 3 may be characteristics of the stroke, the reaction force, and the braking force, respectively, and upper and lower sides of the menu bar may be varying amounts of the stroke, the reaction force, and the braking force. Additionally, the relationship of the upper and lower sides of the menu bar and the varying amounts of the stroke, the reaction force, and the braking force may be oppositely set.

The display form of the display device 70, which provides the menu from which a map may be selected, may select a basic menu C to select a basic map. In addition, a plurality of menus, which includes the basic menu C for each of the characteristics of the stroke, the reaction force, and the braking force, may be provided as a form of menu bar. The selected menu in the menu bar is illustrated in FIG. 4 as a hatched shape to visually show the selected menu.

The driver may select the menu using a touch screen by touching the menu bar, or may select the menu by moving a hatched portion up and down using an operating key. In addition, when the menu for each characteristic is selected by an operation of the driver, the display control unit 72 may be configured to receive from the display device 70 information regarding characteristics of the stroke, the reaction force, and the braking force, which correspond to the selected menu, and may be configured to transmit the received information to the brake control unit 32. Moreover, the brake control unit 32 may be configured to operate the hydraulic power unit 40 and the solenoid 14 by the map that corresponds to the selected menu.

Figure 5:
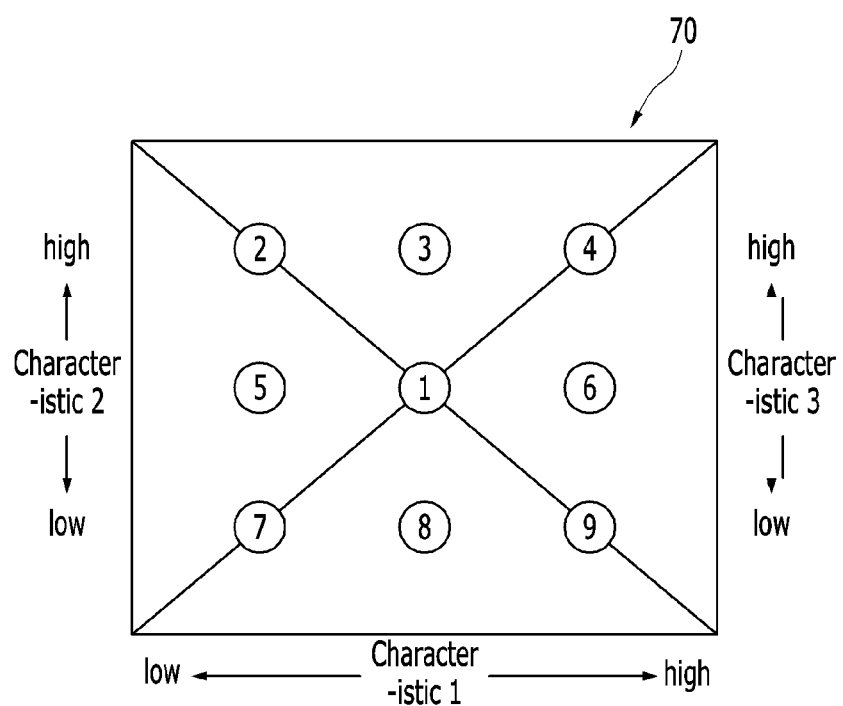
FIG. 5 is an exemplary view illustrating another display form of the display device according to the exemplary embodiment of the present invention.

FIG. 5 is an exemplary view illustrating another display form of the display device according to the exemplary embodiment of the present invention.

Another display form of the display device 70 according to the exemplary embodiment of the present invention may be a form of displaying a menu panel for characteristic 1, characteristic 2, and characteristic 3 on the screen of the display device 70. In particular, a vertical axis of the menu panel may be an axis for adjusting two characteristics among the characteristics of characteristic 1, characteristic 2, and characteristic 3, and a horizontal axis thereof may be an axis for adjusting the remaining one characteristic. In addition, upper and lower sides of the vertical axis may be varying amounts of the two characteristics, and left and right sides of the horizontal axis may be varying amounts of the remaining one characteristic. The relationship of the upper, lower, left, and right sides and the varying amounts of the characteristics may be oppositely set.

Another display form of the display device 70, which provides the menu from which a map may be selected, may include a plurality of buttons disposed in a matrix on the menu panel. In addition, another display form of the display device 70 provides a basic menu (No. 1 button menu) from which a basic map may be selected. In addition, a plurality of menus, which may include the basic menu (No. 1 button menu) for each of the characteristics of the stroke, the reaction force, and the braking force, may be provided as a form of button. Although nine buttons are illustrated in FIG. 5 with numbers from 1 to 9, the number of buttons is not limited thereto.

The driver may select the menu using a touch screen by touching the button, or may select one of the menus displayed with the buttons by using upper, lower, left, and right and selecting operating keys. In particular, since a description regarding a control by the map that corresponds to the selected menu is the same as the description of FIG. 4, a repeated description will be omitted.

Figure 6:
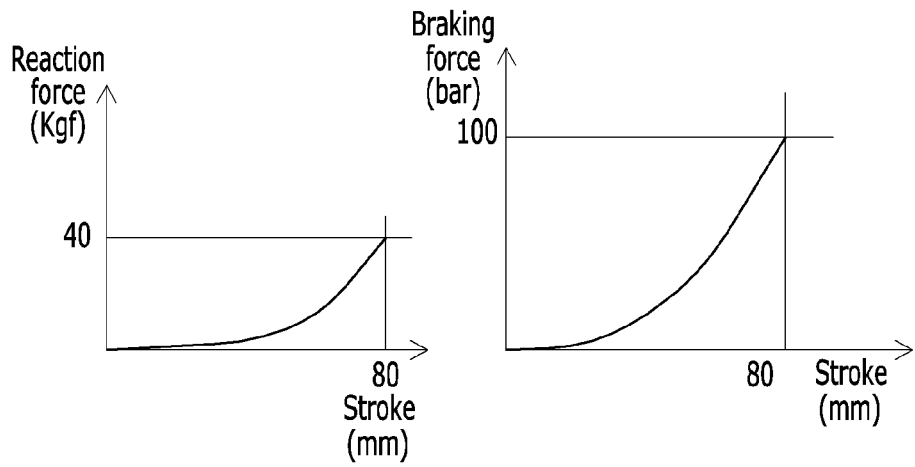
FIG. 6 is an exemplary view illustrating a relationship of a pedal stroke, reaction force, and braking force according to the exemplary embodiment of the present invention.
Figure 6:
Figure 6:
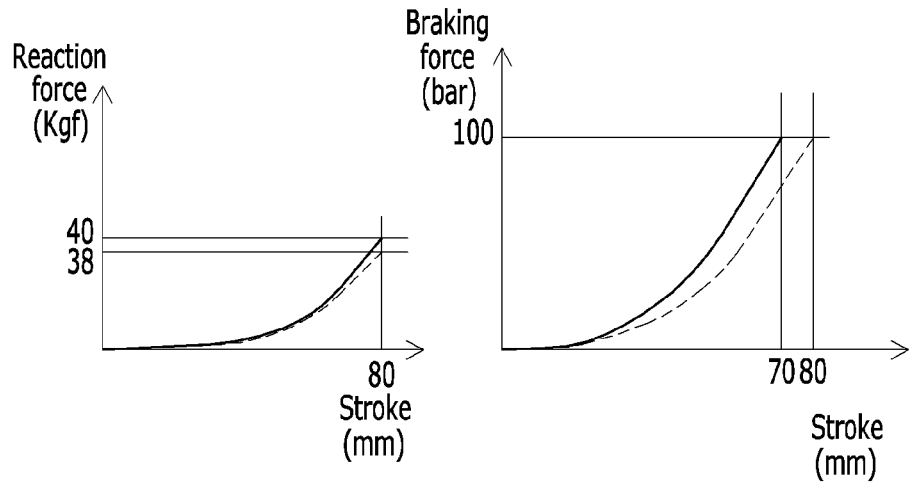

FIG. 6 is an exemplary view illustrating a relationship of the pedal stroke, the reaction force, and the braking force according to the exemplary embodiment of the present invention. In addition, FIG. 6 is an exemplary graph illustrating a map selection based on an UI (user interface) according to the display form of the display device 70 illustrated in FIG. 4. Meanwhile, numbers disclosed in FIG. 6 are provided for better understanding regarding the graph, and the present invention is not limited thereto.

As illustrated in FIG. 6, when the menu is selected decreasing the reaction force (see FIG. 4), the map, which forms a graph in which a size of the reaction force is decreased based on the stroke, may be selected. FIG. 6 illustrates a curved line graph in which the reaction force becomes 40 at the stroke of 80 is changed to a curved line graph in which the reaction force becomes 38 at the same stroke of 80.

As described above, when the menu is selected with respect to the reaction force, and then the menu is selected decreasing the stroke, or the menu is selected increasing the braking force (see FIG. 4), the map, which forms a graph in which the stroke is decreased based on the braking force, and the braking force is increased based on the stroke, may be selected. In particular, the relationship of the reaction force and the stroke may be maintained to be a relationship in respect to the map selected from a menu setting of the reaction force. FIG. 6 illustrates a curved line graph in which the braking force becomes 100 at the stroke of 80 is changed to a curved line graph in which the braking force identically becomes 100 at the stroke of 70.

According to the map selection based on the UI (user interface) according to the display form of the display device 70, the driver may select the menu with respect to the three characteristics. In particular, the relationship of two characteristics by the preceding menu selection may be maintained during the following menu selection. In other words, the driver may select all the menus with respect to three characteristics, or may select only the menu with respect to one or two characteristics.

Figure 7:
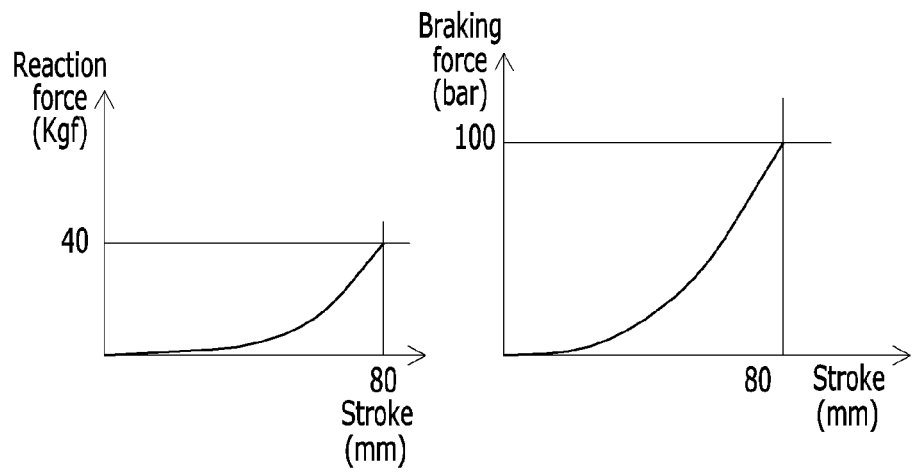
FIG. 7 is an exemplary view illustrating another relationship of a pedal stroke, reaction force, and braking force according to the exemplary embodiment of the present invention.
Figure 7:
Figure 7:
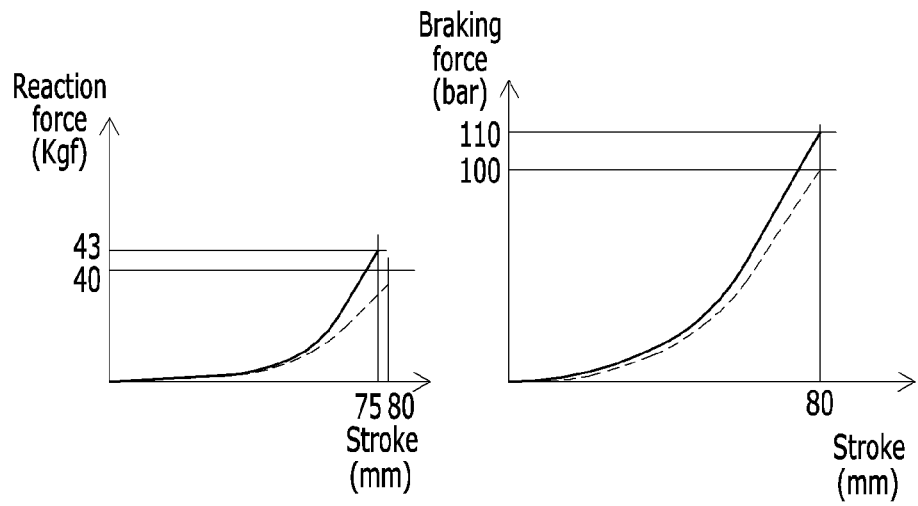

FIG. 7 is an exemplary view illustrating a relationship of the pedal stroke, the reaction force, and the braking force by another exemplary embodiment of the present invention. In addition, FIG. 7 is an exemplary graph illustrating a map selection based on an UI (user interface) according to another display form of the display device 70 illustrated in FIG. 5. Meanwhile, numbers disclosed in FIG. 7 are provided for better understanding regarding the graph, and the present invention is not limited thereto.

As illustrated in FIG. 7, according to the map selection based on the UI (user interface) according to another display form of the display device 70, three characteristics may be simultaneously changed by selecting one button. In other words, when the map is changed by selecting one of No. 2, No. 4, No. 7, and No. 9 button menus in a basic map state in which the basic menu (No. 1 button menu) is selected, three characteristics may be simultaneously changed (see FIG. 5).

Moreover, when the map is changed by selecting one of No. 5 and No. 6 button menus in the basic map state in which the basic menu (No. 1 button menu) is selected, characteristic 1 may be changed when characteristic 2 and characteristic 3 are fixed. In addition, when the map is changed by selecting one of No. 3 and No. 8 button menus in the basic map state in which the basic menu (No. 1 button menu) is selected, characteristic 2 and characteristic 3 may be simultaneously changed when characteristic 1 is fixed (see FIG. 5).

FIG. 7 illustrates an exemplary state in which another map of which three characteristics are simultaneously changed is selected as No. 2 menu is selected in the basic map state. For example, a state is illustrated in which when No. 2 menu is selected, a curved line graph in which the reaction force becomes 40 at the stroke of 80 is changed to a curved line graph in which the stroke becomes 75 at the reaction force of 43, and at the same time, a curved line graph in which the braking force becomes 100 at the stroke of 80 is changed to a curved line graph in which the braking force becomes 110 at the stroke of 80.

Figure 8:
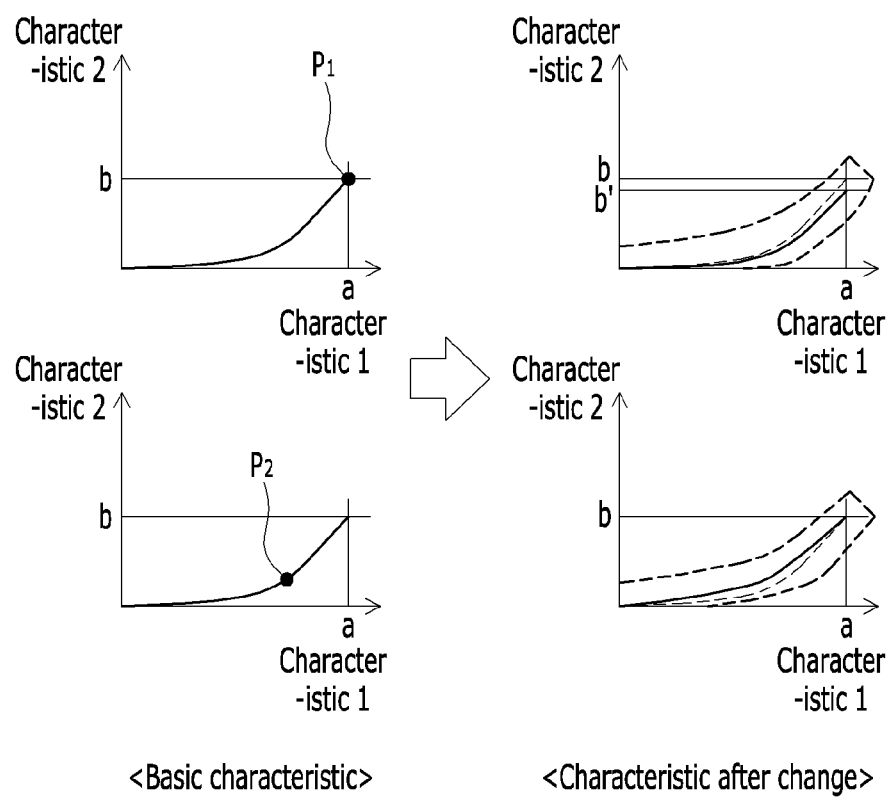
FIG. 8 is an exemplary view illustrating a relationship of a pedal stroke, reaction force, and braking force by yet another control according to the exemplary embodiment of the present invention.

FIG. 8 is an exemplary view illustrating a relationship of the pedal stroke, the reaction force, and the braking force by yet another exemplary embodiment of the present invention. As illustrated in FIG. 8, a graph is directly displayed on the screen of the display device 70, and the graph may be changed using a touch screen by directly touching the graph.

When a curved line graph is changed showing two characteristics having different relationships according to a movement of a point P1 is illustrated at an upper side of FIG. 8. In addition, when a relationship of two characteristics at one point (a, b) is maintained and a slope of a curved line graph is changed according to a movement of a point P2 is illustrated at a lower side of FIG. 8. These movements of the points P1 and P2 may be performed within a range that is displayed on the screen of the display device 70. Moreover, the range may be a range where a curved line graph may be varied, and may be set by a person skilled in the art through experiments and calculations.

As described above, according to the exemplary embodiments of the present invention, the reaction force may be controlled using the solenoid 14 to change the reaction force based on a driver intention. Therefore, marketability of a brake control and satisfaction of the driver may be improved. In addition, the map with respect to the characteristics of the pedal stroke, the reaction force, and the braking force may be set in advance, and a driver may select the characteristics of the pedal stroke, the reaction force, and the braking force from a predetermined map, thereby securing reliability with respect to performance of a brake.

While this invention has been described in connection with what is presently considered to be exemplary embodiments, it is to be understood that the invention is not limited to the disclosed embodiments. On the contrary, it is intended to cover various modifications and equivalent arrangements included within the spirit and scope of the accompanying claims.

What is claimed is:

1. A brake control system for a vehicle, comprising:
a master cylinder configured to transmit braking hydraulic pressure to a wheel;
a hydraulic power unit configured to supply hydraulic pressure to the master cylinder to produce braking hydraulic pressure by the master cylinder that is transmitted to the wheel;
a push rod operated according to a brake pedal operation to cause the master cylinder to produce braking hydraulic pressure that is transmitted to the wheel;
a push rod cylinder in which the push rod performs reciprocal motion;
a reaction force producer configured to supply hydraulic pressure to the push rod cylinder to produce reaction force against an operation of the push rod;
a solenoid disposed within the reaction force producer and operated by electric power to cause the reaction force to be produced;
a pedal stroke sensor configured to detect a stroke of the brake pedal;
a brake control unit connected to the hydraulic power unit, the reaction force producer, and the pedal stroke sensor, configured to operate the hydraulic power unit and the reaction force producer, and configured to maintain a relationship of braking force, the reaction force, and the stroke;
a display device configured to display the braking force, the react force, and the stroke to control a relationship of the braking force, the reaction force, and the stroke based on a driver intention, and configured to recognize the driver intention,
wherein the brake control unit maintains electric power applied to the solenoid.

2. The brake control system of claim 1, wherein: the display device is configured to output a menu to change a state of the braking force, the reaction force, and the stroke, and recognizes the driver intention of the driver based on a selected menu.

3. The brake control system of claim 2, wherein the display device is configured to output the menu as a menu bar.

4. The brake control system of claim 2, wherein the display device is configured to output the menu as a menu panel including a plurality of buttons.

5. The brake control system of claim 2, wherein the display device is configured to output the menu as a graph.

6. The brake control system of claim 1, further comprising:
a reservoir tank configured to tune a flow rate by supplementing or receiving the flow rate on a hydraulic pressure line; and
a control flow path formed to supply hydraulic pressure from the reservoir tank to the push rod cylinder,
wherein the hydraulic pressure in the push rod cylinder is tuned by the hydraulic pressure supplied via the control flow path.

7. The brake control system of claim 6, wherein:
the push rod cylinder is partitioned by the push rod to form chambers at both sides of the push rod cylinder, and
the control flow path branches to connect to the chambers at both sides, respectively.

8. The brake control system of claim 6, wherein the control flow path is blocked by an operation of the push rod.

9. The brake control system of claim 1, further comprising:
a connecting flow path that connects the master cylinder and the push rod cylinder,
wherein the connecting flow path is a hydraulic pressure line formed to transmit hydraulic pressure of the push rod cylinder to the master cylinder.

10. The brake control system of claim 9, wherein a check valve is disposed on the connecting flow path, and is selectively opened and closed.

11. The brake control system of claim 1, wherein:
the reaction force producer is formed in a cylinder shape, and includes a reaction force piston configured to perform reciprocal motion in the reaction force producer; and
an operating rod operated to push the reaction force piston,
wherein the solenoid is formed in a hollow cylindrical shape, and the operating rod is disposed in a hollow portion of the solenoid to be operated by an electric field generated by the solenoid.

12. A brake control method, comprising:
supplying, by a controller, hydraulic pressure to a master cylinder to produce braking hydraulic pressure by the master cylinder transmitted to a wheel;
supplying, by the controller, hydraulic pressure to a push rod cylinder to produce reaction force against an operation of the push rod;
detecting, by the controller, a stroke of the brake pedal;
maintaining, by the controller, electric power applied to a solenoid to cause the reaction force to be produced;
displaying, by the controller via a display device, the braking force, the reaction force, and the stroke to control a relationship of the braking force, the reaction force, and the stroke based on a driver intention.

13. The method of claim 12, further comprising:
outputting, by the controller, a menu to change a state of the braking force, the reaction force, and the stroke; and
recognizing, by the controller, the driver intention of the driver based on a selected menu.

* * * * *